United States Patent
Liu et al.

(10) Patent No.: US 11,417,233 B2
(45) Date of Patent: Aug. 16, 2022

(54) SYSTEMS AND METHODS FOR ASSISTING A USER IN PRACTICING A MUSICAL INSTRUMENT

(71) Applicant: SUNLAND INFORMATION TECHNOLOGY CO., LTD., Shanghai (CN)

(72) Inventors: Xiaolu Liu, Shanghai (CN); Bin Yan, Shanghai (CN); Gang Tong, Shanghai (CN); Guodong Zhou, Shanghai (CN)

(73) Assignee: SUNLAND INFORMATION TECHNOLOGY CO., LID., Shanghai (CN)

( * ) Notice: Subject to any disclaimer, the term of this patent is extended or adjusted under 35 U.S.C. 154(b) by 209 days.

(21) Appl. No.: 16/857,206

(22) Filed: Apr. 24, 2020

(65) Prior Publication Data

US 2020/0251011 A1    Aug. 6, 2020

Related U.S. Application Data

(63) Continuation of application No. PCT/CN2019/076561, filed on Feb. 28, 2019.

(30) Foreign Application Priority Data

Jun. 14, 2018  (CN) .......................... 201810614945.0

(51) Int. Cl.
*G09B 15/02*   (2006.01)
*G10H 1/00*    (2006.01)
*G10H 1/34*    (2006.01)

(52) U.S. Cl.
CPC ......... *G09B 15/023* (2013.01); *G10H 1/0008* (2013.01); *G10H 1/34* (2013.01); *G10H 2210/091* (2013.01); *G10H 2220/455* (2013.01)

(58) Field of Classification Search
CPC ...... G09B 15/023; G10H 1/0008; G10H 1/34; G10H 2210/091; G10H 2220/455
(Continued)

(56) References Cited

U.S. PATENT DOCUMENTS

| | | | | |
|---|---|---|---|---|
| 5,557,055 A | * | 9/1996 | Breitweiser, Jr. .... | G10H 1/0016 84/478 |
| 6,025,551 A | * | 2/2000 | Munekawa .......... | G10H 1/0016 84/485 R |

(Continued)

FOREIGN PATENT DOCUMENTS

| CN | 103150940 A | 6/2013 |
|---|---|---|
| CN | 103235641 A | 8/2013 |

(Continued)

OTHER PUBLICATIONS

International Search Report in PCT/CN2019/076561 dated May 29, 2019, 5 pages.

(Continued)

*Primary Examiner* — Christina M Schreiber
(74) *Attorney, Agent, or Firm* — Metis IP LLC

(57) ABSTRACT

The present disclosure is related to systems and methods for assisting a user in practicing a smart musical instrument. The method includes obtaining a real-time image of the user playing the smart musical instrument. The method also includes obtaining information associated with a current key being pressed and information associated with a plurality of reference fingerings from the smart musical instrument. The method also includes displaying the real-time image in real-time. The method also includes determining whether a current fingering associated with the current key being pressed matches with a reference fingering, of the plurality of reference fingerings, associated with the current key being pressed. In response to a determination that the current fingering associated with the current key being pressed does (Continued)

not match the reference fingering, the method further includes generating a reminder. The method still further includes displaying the reference fingering corresponding to the current fingering.

20 Claims, 10 Drawing Sheets

(58) Field of Classification Search
USPC ........................................................ 84/471 R
See application file for complete search history.

(56) References Cited

U.S. PATENT DOCUMENTS

| | | | |
|---|---|---|---|
| 9,269,340 B2* | 2/2016 | Udell, III | G10H 1/02 |
| 10,235,898 B1* | 3/2019 | Ryynänen | G09B 15/003 |
| 2004/0244570 A1* | 12/2004 | Ando | G10H 1/0016 |
| | | | 84/744 |
| 2009/0019990 A1* | 1/2009 | Chien | G09B 15/08 |
| | | | 84/478 |
| 2012/0132057 A1* | 5/2012 | Kristensen | G10H 1/383 |
| | | | 84/650 |
| 2015/0046824 A1* | 2/2015 | Humphrey | G10H 1/0058 |
| | | | 715/727 |
| 2016/0267895 A1* | 9/2016 | Jeon | G10H 1/32 |
| 2018/0137425 A1* | 5/2018 | D'Alo' | G06N 5/04 |
| 2018/0342229 A1* | 11/2018 | Yan | G10H 1/344 |
| 2019/0272810 A1* | 9/2019 | Yan | G10H 1/0008 |
| 2020/0251011 A1* | 8/2020 | Liu | G10H 1/0008 |
| 2020/0258490 A1* | 8/2020 | Liu | G10H 1/0008 |

FOREIGN PATENT DOCUMENTS

| | | | | |
|---|---|---|---|---|
| CN | 105513580 A | | 4/2016 | |
| CN | 106205576 A | | 12/2016 | |
| CN | 106340215 A | | 1/2017 | |
| CN | 106355974 A | * | 1/2017 | ............ G09B 15/00 |
| CN | 106355974 A | | 1/2017 | |
| CN | 106527718 A | | 3/2017 | |
| CN | 107978303 A | * | 5/2018 | |
| CN | 108052277 A | | 5/2018 | |
| CN | 108074439 A | | 5/2018 | |
| JP | 2011215856 A | | 10/2011 | |
| WO | 2017121049 A1 | | 7/2017 | |
| WO | 2019237766 A1 | | 12/2019 | |

OTHER PUBLICATIONS

Written Opinion in PCT/CN2019/076561 dated May 29, 2019, 5 pages.
First Office Action in Chinese Application No. 201810614945.0 dated Apr. 10, 2020, 15 pages.

* cited by examiner

SYSTEMS AND METHODS FOR ASSISTING A USER IN PRACTICING A MUSICAL INSTRUMENT

CROSS-REFERENCE TO THE RELATED APPLICATIONS

This application is a continuation application of International Application No. PCT/CN2019/076561, field on Feb. 28, 2019, which claims priority of Chinese Patent Application No. 201810614945.0, filed on Jun. 14, 2018, the entire contents of each of which are hereby incorporated by reference.

TECHNICAL FIELD

This disclosure generally relates to a musical instrument, and more particularly, to systems and methods for assisting a user in practicing a musical instrument.

BACKGROUND

Musical instruments, such as piano, violin, and guitar, are widely played around the world. For example, a piano is a musical instrument played using a keyboard. The piano may include pedals, tuning nails, hammers, dampers, a soundboard, and keys (e.g., white keys and black keys). A piano has a row of 88 black and white keys including 52 white keys and 36 black keys. The keys may be mechanically connected to hammers. The dampers may contact with metal strings to prevent the metal strings from vibrating. The soundboard may be a large wooden board (e.g., a maple solid wood board for a high-grade piano, a medium density fiberboard for a low-grade, modern piano) located inside the piano. The soundboard may be attached to the tuning nail and cling to the metal strings. When a key of a piano is pressed by a player, a hammer may strike a metal string and the metal string may vibrate at a resonant frequency to generate acoustic waves. The vibrations may be transmitted to the soundboard and amplified by coupling the acoustic energy to the air. When the key is released, the damper may stop the vibration of the metal string.

With the development of technology, modern pianos are constantly combining with new techniques. The learning of musical instruments requires a lot of repetitive exercises, which may be difficult for a beginner. For example, a piano student (especially a beginning student) may find it difficult to learn fingering and hand positions, pedaling techniques, and other piano techniques. Accordingly, it is desirable to provide systems and methods for assisting a user in practicing a musical instrument.

SUMMARY

According to an aspect of the present disclosure, an augmented reality (AR) based method, for assisting a user in practicing a smart musical instrument, implemented on a smart device, may include one or more of the following operations performed by at least one processor. The method may include obtaining a real-time image of the user playing the smart musical instrument. The method may also include obtaining information associated with a current key being pressed and information associated with a plurality of reference fingerings from the smart musical instrument. The method may also include displaying the real-time image in real-time. The method may also include determining, based on the real-time image, the information associated with the current key being pressed, and the information associated with the plurality of reference fingerings, whether a current fingering associated with the current key being pressed matches with a reference fingering, of the plurality of reference fingerings, associated with the current key being pressed. In response to a determination that the current fingering associated with the current key being pressed does not match the reference fingering, the method may also include generating a reminder. The method may further include displaying the reference fingering corresponding to the current fingering.

In some embodiments, the method may also include obtaining, from the smart musical instrument, a fingering prompt corresponding to each of the plurality of reference fingerings in real time. The method may further include displaying the fingering prompt for a next fingering corresponding to the current fingering.

In some embodiments, in response to the determination that the current fingering associated with the current key being pressed does not match the reference fingering, the generating a reminder may be done via at least one picture of a virtual instrument keyboard, a fingering, a hand posture, or a text relating to the current fingering associated with the current key being pressed. The method may also include displaying an error corresponding to the current fingering associated with the current key being pressed.

In some embodiments, the method may also include generating a reminder via at least one of a picture of a virtual instrument keyboard, a fingering, a hand posture, or a text relating to the current fingering associated with the current key being pressed. The method may further include displaying the reference fingering.

According to another aspect of the present disclosure, an augmented reality (AR) based system, for assisting a user in practicing a smart musical instrument, implemented on a smart device, may include an image obtaining module, an information receiving module, and a teaching module. The image obtaining module may be configured to obtain a real-time image of the user playing the smart musical instrument. The information receiving module may be configured to obtain information associated with a current key being pressed and information associated with a plurality of reference fingerings from the smart musical instrument. The teaching module may be configured to display the real-time image in real-time. The teaching module may be configured to determine, based on the real-time image, the information associated with the current key being pressed, and the information associated with the plurality of reference fingerings, whether a current fingering associated with the current key being pressed matches with a reference fingering associated with the current key being pressed. In response to a determination that the current fingering associated with the current key being pressed does not match the reference fingering, the teaching module may be configured to generate a reminder. The teaching module may be configured to display the reference fingering corresponding to the current fingering.

In some embodiments, the information receiving module may further be configured to obtain, from the smart musical instrument, a real-time fingering prompt corresponding to the plurality of reference fingerings. The teaching module may further be configured to display the prompt for a next fingering corresponding to the current fingering.

In some embodiments, in response to the determination that the current fingering associated with the current key being pressed does not match the reference fingering, the reminder may include at least one of a picture of a virtual instrument keyboard, a fingering, a hand posture or a text relating to the current fingering associated with the current key being pressed, the teaching module may further be configured to display an error corresponding to the current fingering associated with the current key being pressed.

In some embodiments, the teaching module may further be configured to generate a reminder via at least one of a picture of a virtual instrument keyboard, a fingering, a hand posture, or text relating to the current fingering associated with the current key being pressed. The teaching module may further be configured to display the reference fingering.

According to still another aspect of the present disclosure, a non-transitory computer-readable storage medium may include at least one set of instructions for assisting a user in practicing a smart musical instrument. Wherein when executed by at least one processor, the at least one set of instructions may cause the at least one processor to perform a method for assisting a user in practicing a smart musical instrument.

According to still another aspect of the present disclosure, a smart device may include at least one computer-readable storage medium storing a set of instructions, and at least one processor configured to communicate with the at least one computer-readable storage medium. When executing the set of instructions, the at least one processor may be directed to perform a method for assisting a user in practicing a smart musical instrument.

According to still another aspect of the present disclosure, a method for assisting a user in practicing a smart musical instrument may be implemented on a smart device having one or more cameras, one or more processors, and one or more storage devices. The method may include obtaining, by the one or more processors, image data associated with at least one portion of a user acquired by the one or more cameras. The method may also include obtaining, by the one or more processors, first performance data of the user from the smart musical instrument. The image data and the first performance data may reflect an operation of the smart musical instrument by the user and the first performance data may be associated with a component of the smart musical instrument. The method may also include obtaining, by the one or more processors, a reference performance. The method may also include determining whether the operation matches the reference performance based on the reference performance and at least one of the image data or the first performance data. In response to a determination that the operation does not match the reference performance, the method may also include generating, by the one or more processors, a reminder associated with the operation that does not match the reference performance. The method may further include causing, by the one or more processors, the smart device to display the reference performance.

In some embodiments, the component of the smart musical instrument may include at least one of a plurality of keys or a pedal. The first performance data may include at least one of: an identity of a current key being pressed, a time of the current key being pressed, a time of the pedal being stepped on, a musical note produced by the current key being pressed, and a musical note produced by the pedal being stepped on.

In some embodiments, the method may also include identifying second performance data from the image data. The second performance data may be associated with at least one portion of a body of the user. The method may also include determining whether the operation matches the reference performance based on the first performance data and the second performance data.

In some embodiments, the second performance data may include a current fingering associated with the current key being pressed. The reference performance may include reference fingerings associated with the plurality of keys. The method may also include identifying the current fingering associated with the current key being pressed from the image data. The method may also include determining one of the reference fingerings that is associated with the current key being pressed based on the first performance data. The method may also include determining whether the current fingering associated with the current key being pressed matches the one of the reference fingerings.

In some embodiments, the generating a reminder may be done by at least one of a picture of a virtual instrument keyboard generated by the smart device, a hand posture, or a text relating to the current fingering associated with the one of the plurality of keys being pressed.

In some embodiments, the method may also include causing the smart device to display an error associated with the current fingering.

In some embodiments, the method may also include obtaining a prompt corresponding to the reference performance. The method may further include causing the smart device to display the prompt associated with the reference performance based on at least one of the image data and/or the first performance data of the user.

In some embodiments, the method may also include causing the smart device to display the image data of the user.

According to still another aspect of the present disclosure, a system for assisting a user in practicing a smart musical instrument may include one or more cameras, one or more storage devices storing one or more sets of instructions, and one or more processors in communication with the one or more cameras, the one or more storage devices. When executing the one or more set of instructions, the one or more processors may be configured to cause the system to obtain image data associated with at least one portion of a user acquired by the one or more cameras. The one or more processors may be configured to cause the system to obtain first performance data of the user from the smart musical instrument. The image data and the first performance data may reflect an operation of the smart musical instrument by the user and the first performance data may be associated with a component of the smart musical instrument. The one or more processors may be configured to cause the system to obtain a reference performance. The one or more processors may be configured to cause the system to determine whether the operation matches the reference performance based on the reference performance and at least one of the image data or the first performance data. In response to a determination that the operation does not match the reference performance, the one or more processors may be configured to cause the system to generate a reminder associated with the operation that does not match the reference performance. The one or more processors may be configured to cause the system to cause the smart device to display the reference performance.

According to still another aspect of the present disclosure, a non-transitory computer readable medium may include at least one set of instructions for assisting a user in practicing a smart musical instrument. Wherein when executed by one or more processors of a computing device, the at least one set of instructions may cause the computing device to perform a method. The method may include obtaining, by the one or more processors, image data associated with at least one portion of a user acquired by the one or more cameras. The method may include obtaining, by the one or more processors, first performance data of the user from the smart musical instrument. The image data and the first performance data may reflect an operation of the smart musical instrument by the user and the first performance data may be associated with a component of the smart musical instrument. The method may include obtaining, by the one or more processors, a reference performance. The method may include determining whether the operation matches the reference performance based on the reference performance and at least one of the image data or the first performance data. In response to a determination that the operation does not match the reference performance, the method may include generating, by the one or more processors, a reminder associated with the operation that does not match the reference performance. The method may include causing, by the one or more processors, the smart device to display the reference performance.

According to still another aspect of the present disclosure, a system for assisting a user in practicing a smart musical instrument may include an image obtaining module, a performance data obtaining module, a reference performance obtaining module, a determination module, a generation module, and a control module. The image obtaining module may be configured to obtain image data associated with at least one portion of a user acquired by the one or more cameras. The performance data obtaining module may be configured to obtain first performance data of the user from the smart musical instrument. The image data and the first performance data may reflect an operation of the smart musical instrument by the user and the first performance data may be associated with a component of the smart musical instrument. The reference performance obtaining module may be configured to obtain a reference performance. The determination module may be configured to determine whether the operation matches the reference performance based on the reference performance and at least one of the image data or the first performance data. In response to a determination that the operation does not match the reference performance, the generation module may be configured to generate a reminder associated with the operation that does not match the reference performance. The control module may be configured to cause the smart device to display the reference performance.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
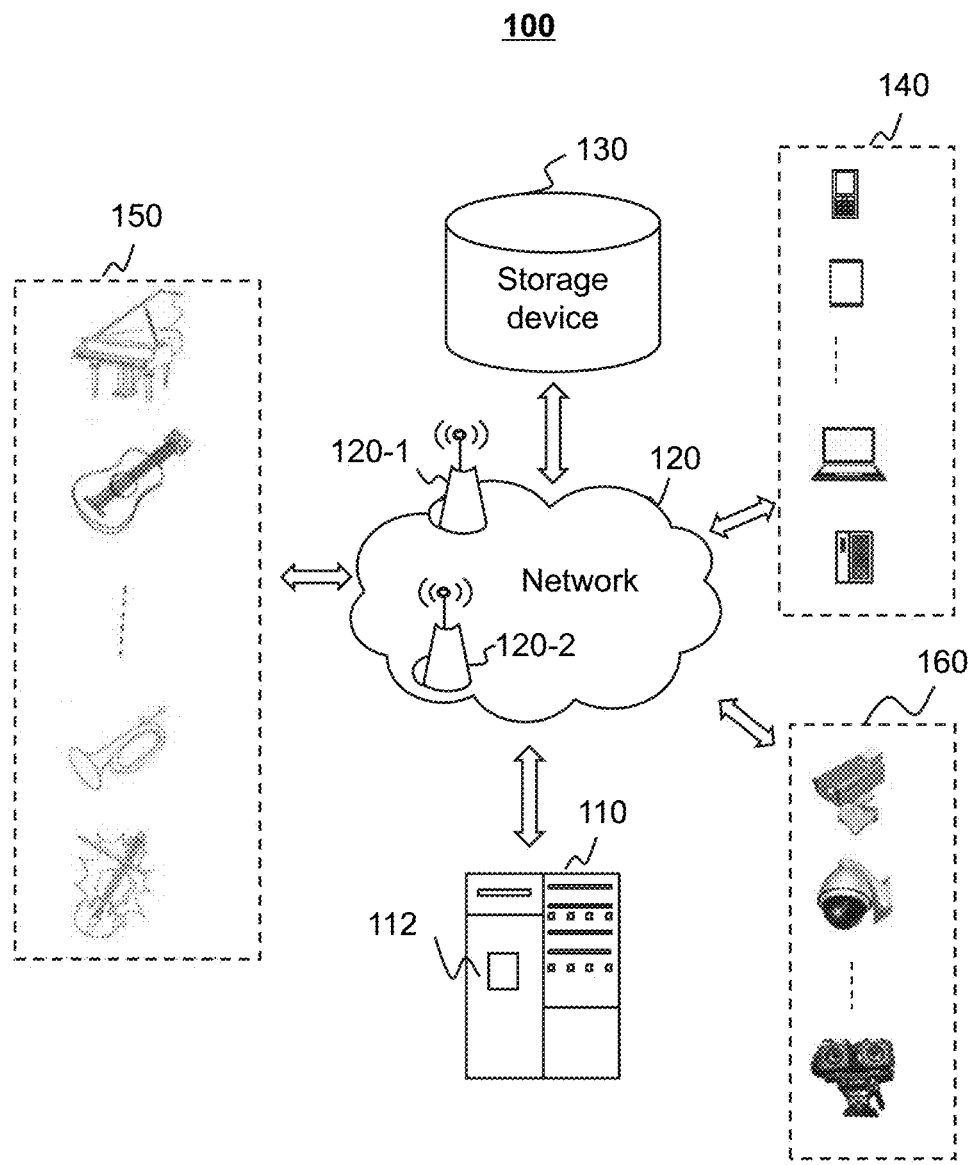
FIG. 1 is a schematic diagram illustrating an exemplary intelligent musical instrument system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a user terminal and/or a server. These modules are intended to be illustrative, not intended to limit the scope of the present disclosure. Different modules may be used in different aspects of the system and method.

According to some embodiments of the present disclosure, flowcharts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure is directed to systems and methods for assisting a user in practicing a smart musical instrument. The systems and methods may obtain image data associated with at least one portion of a user acquired by one or more cameras. The systems and methods may obtain first performance data of the user from the smart musical instrument. The image data and the first performance data may reflect an operation of the smart musical instrument by the user. The first performance data may be associated with a component of the smart musical instrument. The systems and methods may obtain a reference performance. The systems and methods may determine whether the operation matches the reference performance based on the reference performance and at least one of the image data or the first performance data. In response to a determination that the operation does not match the reference performance, the systems and methods may generate a reminder associated with the operation that does not match the reference performance. The systems and methods may cause the smart device to display the reference performance. Accordingly, the systems and methods may assist the user in practicing the smart musical instrument more efficiently.

FIG. 1 is a schematic diagram illustrating an exemplary intelligent musical instrument system according to some embodiments of the present disclosure. The intelligent musical instrument system 100 may include a server 110, a network 120, a storage device 130, a smart device 140, a musical instrument 150, and a camera 160.

The server 110 may facilitate data processing for the intelligent musical instrument system 100. In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the smart device 140, the musical instrument 150, the camera 160, and/or the storage device 130 via the network 120. As another example, the server 110 may be directly connected to the smart device 140, the musical instrument 150, the camera 160, and/or the storage device 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may obtain image data associated with at least one portion of a user acquired by one or more cameras and performance data of a user from a smart musical instrument. As another example, the processing engine 112 may obtain a reference performance. As still another example, the processing engine 112 may determine whether an operation of a smart musical instrument by a user matches a reference performance based on the reference performance and at least one of image data or performance data. In some embodiments, the processing engine 112 may generate a reminder associated with an operation that does not match a reference performance. Further, the processing engine 112 may cause a smart device (e.g., the musical instrument 150, the smart device 140, etc.) to display a reference performance.

In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the intelligent musical instrument system 100 (e.g., the server 110, the storage device 130, the smart device 140, the musical instrument 150, and the camera 160) may send information and/or data to other component(s) in the intelligent musical instrument system 100 via the network 120. For example, the processing engine 112 may obtain image data associated with at least one portion of a user from the camera 160 via the network 120. As another example, the processing engine 112 may obtain performance data of a user from the musical instrument 150 via the network 120. As still another example, the processing engine 112 may obtain a reference performance from the storage device 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the intelligent musical instrument system 100 may be connected to the network 120 to exchange data and/or information.

The storage device 130 may store data and/or instructions. In some embodiments, the storage device 130 may store data obtained from the smart device 140, the musical instrument 150, the camera 160, and/or the processing engine 112. For example, the storage device 130 may store image data associated with at least one portion of a user received from the camera 160. As another example, the storage device 130 may store performance data of a user received from the musical instrument 150. In some embodiments, the storage device 130 may store data and/or instructions that the server 110 may execute or use to perform exemplary methods described in the present disclosure. For example, the storage device 130 may store instructions that the processing engine 112 may execute or use to determine whether an operation of the musical instrument 150 by a user matches a reference performance based on the reference performance and at least one of image data or first performance data.

In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 120 to communicate with one or more components in the intelligent musical instrument system 100 (e.g., the server 110, the smart device 140, the musical instrument 150, and/or the camera 160). One or more components in the intelligent musical instrument system 100 may access the data or instructions stored in the storage device 130 via the network 120. In some embodiments, the storage device 130 may be directly connected to or communicate with one or more components in the intelligent musical instrument system 100 (e.g., the server 110, the smart device 140, the musical instrument 150, and/or the camera 160). In some embodiments, the storage device 130 may be part of the server 110.

The smart device 140 may include a mobile device 140-1, a tablet computer 140-2, a laptop computer 140-3, or the like, or any combination thereof. In some embodiments, the mobile device 140-1 may include a smart home device, a wearable device, a mobile equipment, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile equipment may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc.

In some embodiments, the smart device 140 may include one or more processors as described elsewhere in present disclosure. The one or more processors of the smart device 140 may be configured to perform at least one portion of functions of the processing engine 112. For example, the smart device 140 may obtain image data associated with at least one portion of a user from the camera 160 via the network 120. As another example, the smart device 140 may obtain performance data of a user from the musical instrument 150 via the network 120. As still another example, the smart device 140 may obtain a reference performance from the storage device 130 via the network 120. As still another example, the smart device 140 may determine whether an operation of a smart musical instrument by a user matches a reference performance based on the reference performance and at least one of image data or performance data.

In some embodiments, the smart device 140 may send and/or receive information for assisting a user in practicing a smart musical instrument to and/or from the processing engine 112 via a user interface. The user interface may be in the form of an application for assisting a user in practicing a smart musical instrument implemented on the smart device 140. The user interface implemented on the smart device 140 may be configured to facilitate communication between a user and the processing engine 112. In some embodiments, a user may input a request for assisting the user in practicing a smart musical instrument via the user interface implemented on the smart device 140. The smart device 140 may send the request for assisting a user in practicing a smart musical instrument to the processing engine 112 for assisting the user in practicing a smart musical instrument based on augmented reality (AR) as described elsewhere in the present disclosure (e.g., FIG. 5 and descriptions thereof). In some embodiments, the user interface may facilitate the presentation or display of information and/or data (e.g., a signal) relating to an assistance for a user practicing a smart musical instrument received from the processing engine 112. For example, the information and/or data may include a result generated by the processing engine 112 in an assistance for a user practicing a smart musical instrument. For example, the result may include one or more images (e.g., 2D images, 3D images, etc.), one or more reminders, one or more words, one or more digits, voices etc. In some embodiments, the information and/or data may further be configured to cause the smart device 140 to display the result to the user.

The musical instrument 150 may include a keyboard instrument, a wind instrument, a string instrument, a percussion instrument, or the like, or any combination thereof. Exemplary keyboard instruments may include a piano (e.g., an acoustic piano, an electric piano, an electronic piano, a digital piano, etc.), an organ (e.g., a pipe organ, a Hammond organ, etc.), an accordion, an electronic keyboard, a synthesizer, or the like. Exemplary wind instruments may include a trumpet, a trombone, a euphonium, an oboe, a saxophone, a bassoon, or the like. Exemplary string instruments may include a guitar, a violin, an autoharp, a cimbalom, or the like. Exemplary percussion instruments may include a timpani, a snare drum, a bass drum, a cymbal, a tambourine, or the like. In some embodiments, the musical instrument 150 may be a smart piano. The smart piano may be configured to assist a user in practicing a piano. For example, the smart piano may display one or more piano keys to be pressed during a performance on a picture of a virtual instrument keyboard. As another example, the smart piano may generate a voice to reminder the user how to play the smart piano.

The musical instrument 150 may be connected to and/or in communication with the smart device(s) 140, the server 110, the storage device 130, the camera 160(s), or the like. For example, the musical instrument 150 may transfer data (e.g., performance data of a user generated by practicing the musical instrument 150) to the server 110, the storage device 130, or the like, or any combination thereof. As another example, the musical instrument 150 may receive or retrieve data (e.g., reference performance corresponding to the performance data) from the server 110, the storage device 130, or any other storage.

The camera 160 may be configured to capture image data associated with a user. As used herein, the "image data" may refer to a static image, a series of image frames, a video, etc. In some embodiments, the camera 160 may include a spherical camera, a hemispherical camera, a rifle camera, etc. In some embodiments, the camera 160 may include a black-white camera, a color camera, an infrared camera, an X-ray camera, etc. In some embodiments, the camera 160 may include a digital camera, an analog camera, etc. In some embodiments, the camera 160 may include a monocular camera, a binocular camera, a multi-camera, etc. In some embodiments, the camera 160 may be an IP camera which can transmit the captured image data to any component (e.g., the server 110, the smart device 140, the musical instrument 150, and/or the storage device 130) of the intelligent musical instrument system 100 via the network 120. In some embodiments, the camera 160 may be part of the smart device 140 or the musical instrument 150.

It should be noted that the intelligent musical instrument system 100 is merely provided for the purposes of illustration, and is not intended to limit the scope of the present disclosure. For persons having ordinary skills in the art, multiple variations or modifications may be made under the teachings of the present disclosure. For example, the intelligent musical instrument system 100 may further include a database, an information source, or the like. As another example, the intelligent musical instrument system 100 may be implemented on other devices to realize similar or different functions. However, those variations and modifications do not depart from the scope of the present disclosure. In some embodiments, the musical instrument 150 may be integrated with the smart device 140. For example, an augmented reality device may be integrated with a piano to perform one or more functions of the intelligent musical instrument system 100, such as displaying image data of a user, indicating one or more piano keys to be pressed during a performance on a picture of a virtual instrument keyboard, or the like. Alternatively or additionally, the musical instrument 150 and the smart device 140 may be implemented as a stand-alone device. In some embodiments, the processing engine 112 may be integrated into the smart device 140.

Figure 2:
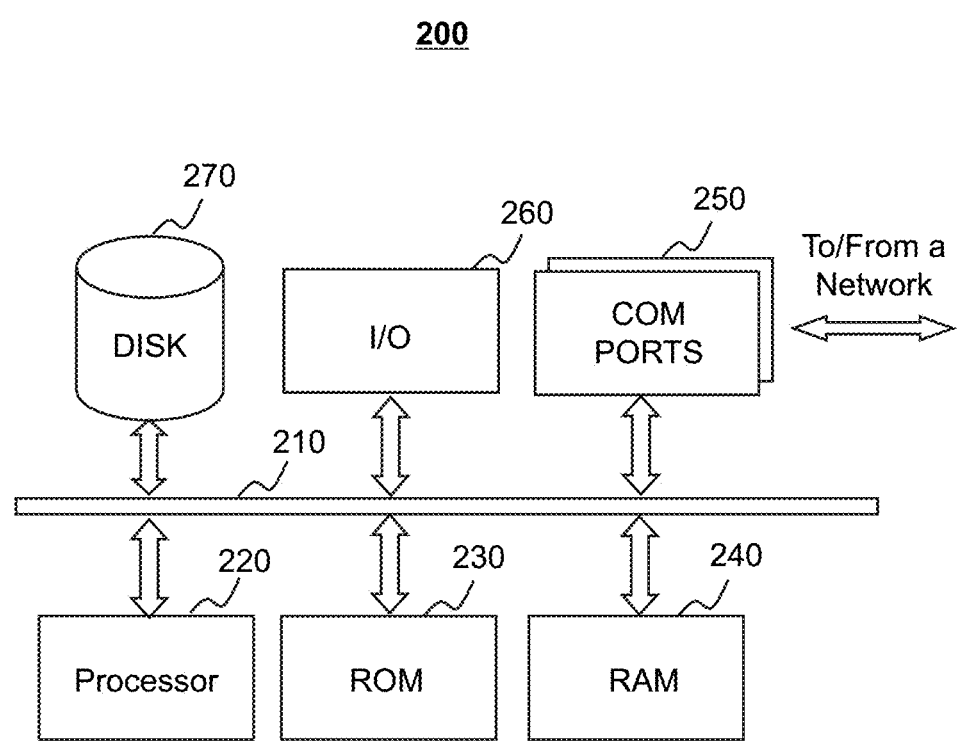
FIG. 2 is a schematic diagram illustrating exemplary components of a computing device according to some embodiments of the present disclosure.

FIG. 2 is a schematic diagram illustrating exemplary components of a computing device on which the server 110, the storage device 130, and/or the smart device 140 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the intelligent musical instrument system 100 as described herein. In FIGS. 1-2, only one such computer device is shown purely for convenience purposes. One of ordinary skill in the art would understood at the time of filing of this application that the computer functions relating to intelligent musical instrument as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or steps performed by one CPU and/or processor as described in the present disclosure may also be jointly or separately performed by the multiple CPUs and/or processors. For example, if in the present disclosure the CPU and/or processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operation s A and B).

Figure 3:
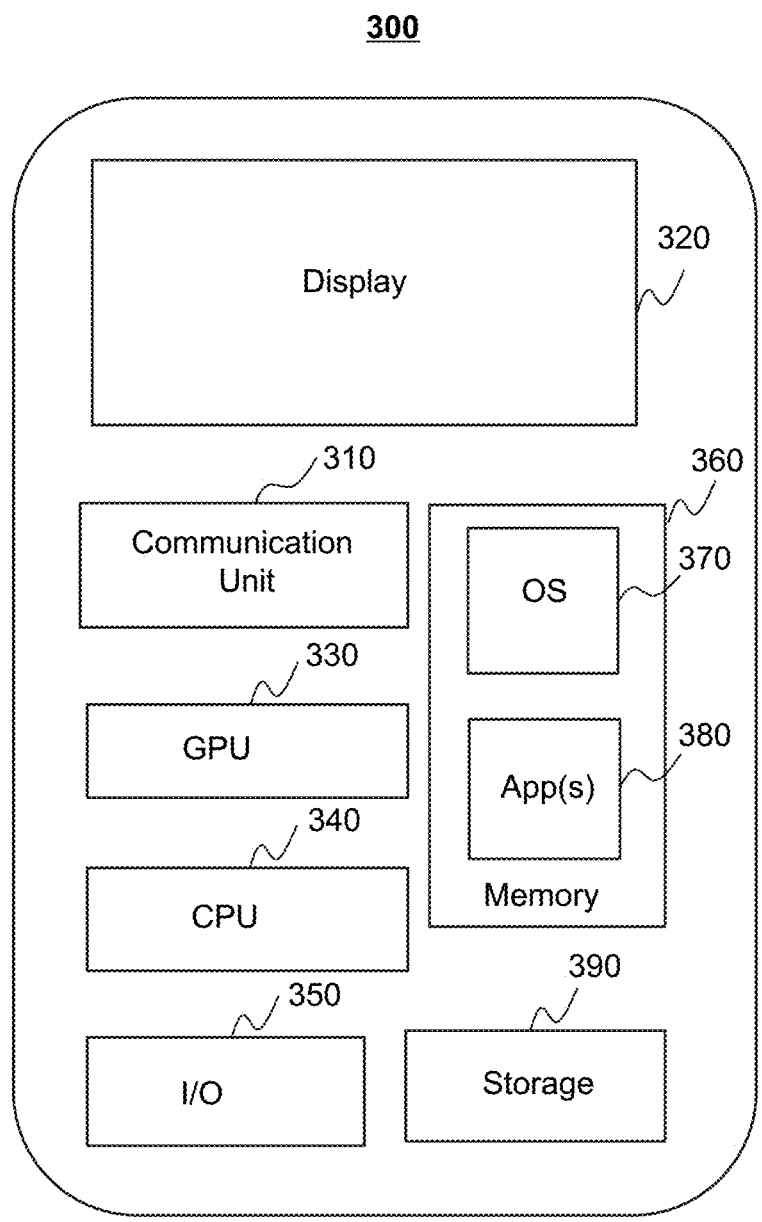
FIG. 3 is a schematic diagram illustrating exemplary hardware and/or software components of an exemplary user terminal according to some embodiments of the present disclosure.

FIG. 3 is a schematic diagram illustrating exemplary hardware and/or software components of an exemplary mobile device according to some embodiments of the present disclosure, on which the smart device 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information from the intelligent musical instrument system 100 on the mobile device 300. User interactions with the information stream may be achieved via the I/O 350 and provided to the processing engine 112 and/or other components of the intelligent musical instrument system 100 via the network 120.

In order to implement various modules, units and their functions described above, a computer hardware platform may be used as hardware platforms of one or more elements (e.g., a component of the sever 110 described in FIG. 2). Since these hardware elements, operating systems, and program languages are common, it may be assumed that persons skilled in the art may be familiar with these techniques and they may be able to provide information required in the intelligent musical instrument system according to the techniques described in the present disclosure. A computer with a user interface may be used as a personal computer (PC), or other types of workstations or terminal devices. After being properly programmed, a computer with a user interface may be used as a server. It may be considered that those skilled in the art may also be familiar with such structures, programs, or general operations of this type of computer device. Thus, extra explanations are not described for the figures.

Figure 4:
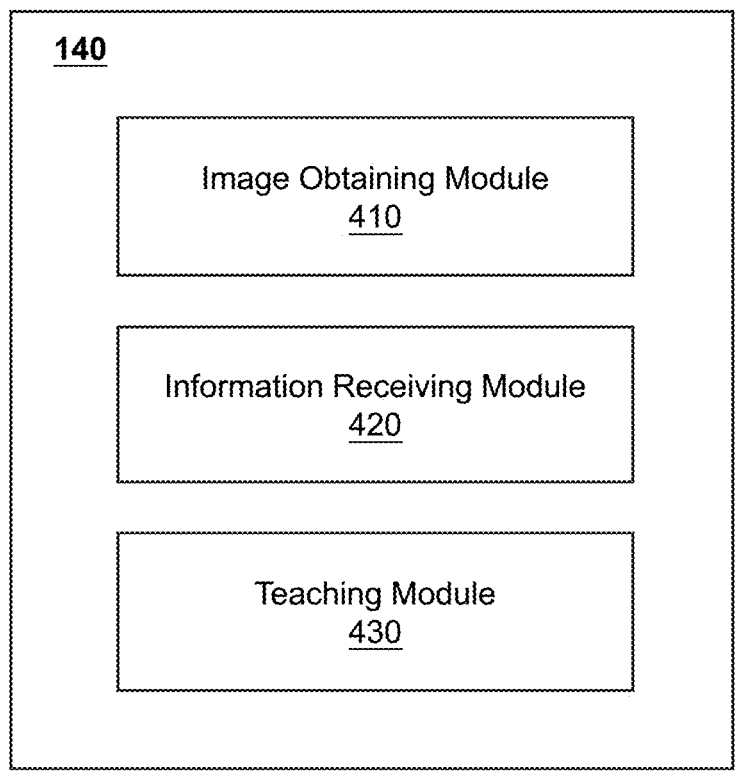
FIG. 4 is a block diagram illustrating an exemplary smart device according to some embodiments of the present disclosure.

FIG. 4 is a schematic diagram illustrating an exemplary smart device according to some embodiments of the present disclosure. In some embodiments, the smart device 140 may include an image obtaining module 410, an information receiving module 420, and a teaching module 430. The modules may be hardware circuits of at least part of the smart device 140. The modules may also be implemented as an application or set of instructions read and executed by the smart device 140. Further, the modules may be any combination of the hardware circuits and the application/instructions. For example, the modules may be the part of the smart device 140 when the smart device 140 is executing the application or set of instructions.

The imaging obtaining module 410 may be configured to obtain a real-time image of a user playing a smart musical instrument. The smart musical instrument may include a smart piano, a smart violin, a smart cello, a smart guitar, or the like. In some embodiments, the imaging obtaining module 410 may obtain the real-time image acquired by a camera (e.g., the camera 160) of the intelligent musical instrument system 100. In some embodiments, the camera may be installed in the smart device 140. In some embodiments, the smart device 140 may be an augmented reality (AR) device, for example, a smart mobile device (e.g., a smart mobile phone, a smart pad), a smart wearable device (e.g., smart glasses), and a laptop computer as described elsewhere in the present disclosure (e.g., FIG. 1 and descriptions thereof).

The information receiving module 420 may be configured to obtain information associated with a current key being pressed and information associated with a plurality of reference fingerings from a smart musical instrument. In some embodiments, the information associated with the current key being pressed may include information associated with a current fingering. In some embodiments, the information receiving module 420 may obtain the information associated with the current key being pressed from one or more sensors and/or one or more key information collection devices installed in one or more components (e.g., keys) of the smart musical instrument.

In some embodiments, a plurality of music scores and a plurality of reference fingerings corresponding to each of the plurality of music scores may be stored in a storage device (e.g., the storage device 130) of the smart musical instrument (e.g., the musical instrument 150) or an external storage device. When a user obtains and/or opens a specific music score via a user interface (e.g., an application), the information receiving module 420 may access the storage device and retrieve the plurality of reference fingerings corresponding to the specific music score.

The information receiving module 420 may be configured to obtain, from a smart musical instrument, a fingering prompt corresponding to each of a plurality of reference fingerings in real-time.

The teaching module 430 may be configured to display a real-time image of a user playing a smart musical instrument in real-time. The teaching module 430 may be configured to determine, based on the real-time image, information associated with a current key being pressed, and information associated with a plurality of reference fingerings, whether a current fingering associated with the current key being pressed matches with a reference fingering, of the plurality of reference fingerings, associated with the current key being pressed. The teaching module 430 may be configured to generate a reminder, and display a reference fingering corresponding to a current fingering in response to a determination that the current fingering associated with a current key being pressed does not match with the reference fingering associated with the current key being pressed.

In some embodiments, the teaching module 430 may identify the current fingering associated with the current key being pressed of the user based on the real-time image of the user. The teaching module 430 may also determine a specific reference fingering from the plurality of reference fingerings according to the current key being pressed by the user. The teaching module 430 may further determine whether the identified current fingering associated with the current key being pressed matches with the specific reference fingering associated with the current key being pressed. In response to a determination that the current fingering associated with the current key being pressed does not match with the reference fingering associated with the current key being pressed, the teaching module 430 may generate a reminder, and display the reference fingering corresponding to the current fingering. In some embodiments, the teaching module 430 may generate the reminder via a picture of a virtual instrument keyboard, a fingering, a hand posture, a text relating to the current fingering associated with the current key being pressed, or the like, or any combination thereof. In some embodiments, the teaching module 430 may display the reminder and/or the current fingering associated with the current key being pressed that does not match the reference fingering associated with the current key being pressed. In some embodiments, the teaching module 430 may display the reference fingering corresponding to the current fingering via a picture of a virtual instrument keyboard, a fingering, a hand posture, a text relating to the reference fingering associated with the current key being pressed, or the like, or any combination thereof.

In some embodiments, the teaching module 430 may be configured to display a fingering prompt for a next fingering corresponding to a current fingering. In some embodiments, the teaching module 430 may display the fingering prompt for the next fingering corresponding to the current fingering in response to a determination that the current fingering associated with a current key being pressed does not match with a reference fingering associated with the current key being pressed. In some embodiments, the teaching module 430 may display the fingering prompt for the next fingering corresponding to the current fingering in response to a determination that the current fingering associated with the current key being pressed matches with the reference fingering associated with the current key being pressed. In some embodiments, the teaching module 430 may display the fingering prompt for the next fingering corresponding to the current fingering no matter whether the current fingering associated with the current key being pressed matches with the reference fingering associated with the current key being pressed.

In some embodiments, the smart device may include an augment reality device, such as smart AR glasses. The smart musical instrument may include a smart piano. The smart device 140 may determine whether a current key being pressed matches with a reference key that should be pressed, whether a current fingering associated with the current key being pressed matches with a reference fingering associated with the current key being pressed, and whether a current hand posture matches with a reference hand posture, etc., based on information obtained from the smart AR glasses and the smart piano. The smart device 140 may generate a reminder in real time via a picture of a virtual instrument keyboard, a fingering, a hand posture, or a text when the user make an incorrect performance.

In some embodiments, the user may wear the smart AR glasses to practice the smart musical instrument. The smart AR glasses may display a virtual picture, a hand posture, or a text to prompt the user how to play the smart musical instrument, which may provide an effective way to assist the user in practicing the smart musical instrument.

It should be noted that the above description of the smart device 140 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 5:
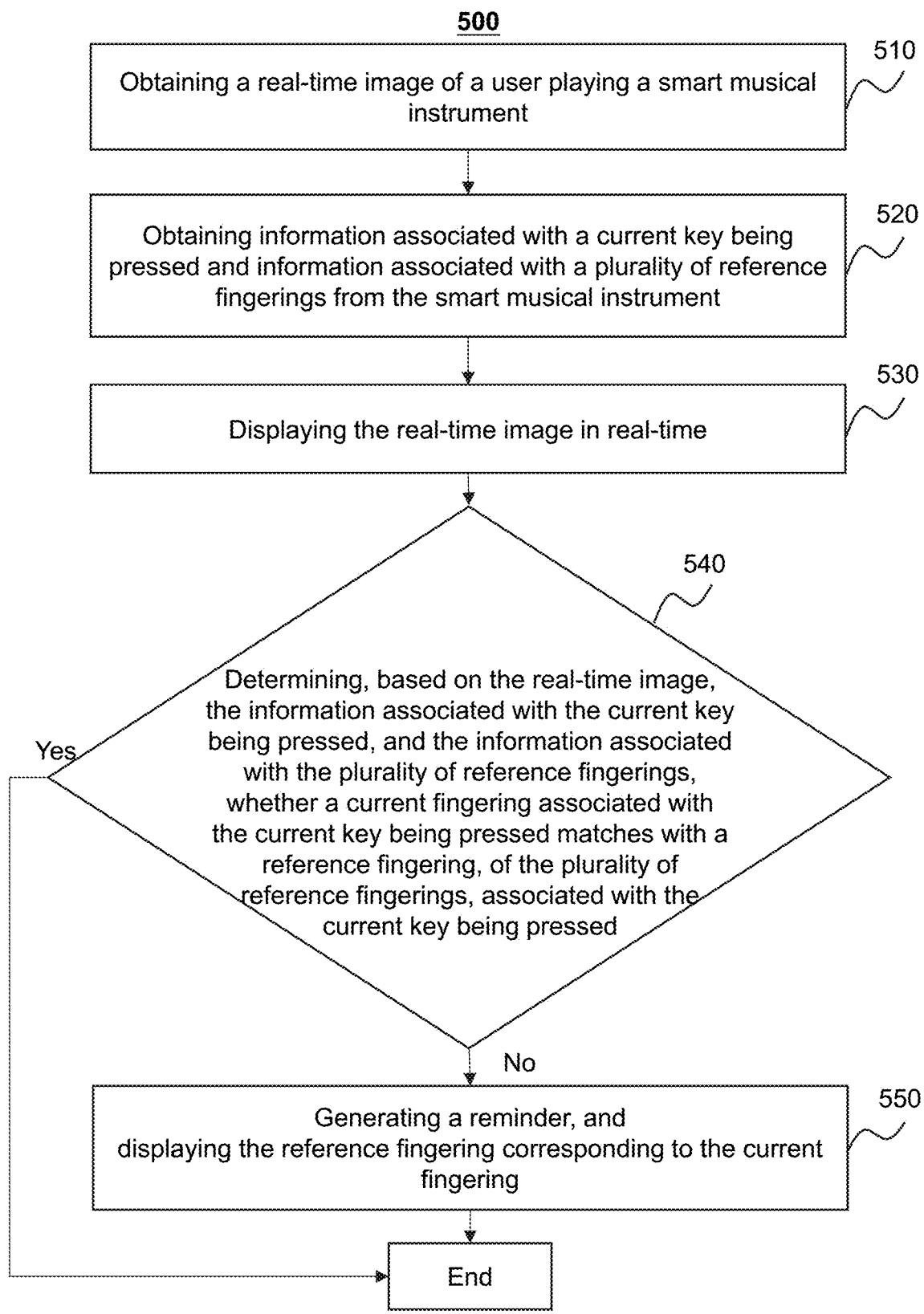
FIG. 5 is a flowchart illustrating an exemplary process for assisting a user in practicing a smart musical instrument according to some embodiments of the present disclosure.

FIG. 5 is a flowchart illustrating an exemplary process for assisting a user in practicing a smart musical instrument according to some embodiments of the present disclosure. In some embodiments, the process 500 may be implemented in the intelligent musical instrument system 100. For example, the process 500 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110) or the smart device 140 including a camera (e.g., the camera 160).

In 510, the smart device 140 (e.g., the image obtaining module 410) may obtain a real-time image of a user playing the smart musical instrument.

The smart musical instrument may include a smart piano, a smart violin, a smart cello, a smart guitar, or the like. In some embodiments, the smart device 140 may obtain the real-time image acquired by a camera (e.g., the camera 160) of the intelligent musical instrument system 100. In some embodiments, the camera may be installed in the smart device 140. In some embodiments, the smart device 140 may be an augmented reality (AR) device, for example, a smart mobile device (e.g., a smart mobile phone, a smart pad), a smart wearable device (e.g., smart glasses), and a laptop computer as described elsewhere in the present disclosure (e.g., FIG. 1 and descriptions thereof).

In 520, the smart device 140 (e.g., the information receiving module 420) may obtain information associated with a current key being pressed and information associated with a plurality of reference fingerings from the smart musical instrument.

In some embodiments, the information associated with the current key being pressed may include information associated with a current fingering. As used herein, a current fingering may refer to postures of a finger corresponding to a current key being pressed by a user playing a musical instrument. A reference fingering may refer to standard postures of a finger corresponding to a key of a musical instrument.

In some embodiments, a plurality of music scores and a plurality of reference fingerings corresponding to each of the plurality of music scores may be stored in a storage device (e.g., the storage device 130) of the smart musical instrument (e.g., the musical instrument 150) or an external storage device. When a user obtains and/or opens a specific music score via a user interface (e.g., an application), the smart device 140 may access the storage device and retrieve the plurality of reference fingerings corresponding to the specific music score.

In some embodiments, the smart device 140 may obtain the information associated with the current key being pressed from one or more sensors and/or one or more key information collection devices installed in one or more components (e.g., keys) of the smart musical instrument.

In 530, the smart device 140 (e.g., the teaching module 430) may display the real-time image in real-time. In some embodiments, the smart device 140 may display the real-time image on a visual interface of the smart device 140 in real-time.

In 540, the smart device 140 (e.g., the teaching module 430) may determine, based on the real-time image, the information associated with the current key being pressed, and the information associated with the plurality of reference fingerings, whether a current fingering associated with the current key being pressed matches with a reference fingering, of the plurality of reference fingerings, associated with the current key being pressed.

In some embodiments, the smart device 140 may identify the current fingering associated with the current key being pressed of the user based on the real-time image of the user. The smart device 140 may further determine a specific reference fingering from the plurality of reference fingerings according to the current key being pressed by the user. The smart device 140 may further determine whether the identified current fingering associated with the current key being pressed matches with the specific reference fingering associated with the current key being pressed. In response to a determination that the current fingering associated with the current key being pressed matches with the reference fingering associated with the current key being pressed, process 500 may be terminated. In response to a determination that the current fingering associated with the current key being pressed does not match with the reference fingering associated with the current key being pressed, process 500 may proceed to operation 550.

In 550, the smart device 140 (e.g., the teaching module 430) may generate a reminder, and display the reference fingering corresponding to the current fingering.

The reminder may include an error associated with the current fingering associated with the current key being pressed that does not match the reference fingering associated with the current key being pressed. In some embodiments, the smart device 140 may generate the reminder via a picture of a virtual instrument keyboard, a fingering, a hand posture, a text relating to the current fingering associated with the current key being pressed, or the like, or any combination thereof. In some embodiments, the smart device 140 may display the reminder and/or the current fingering associated with the current key being pressed that does not match the reference fingering associated with the current key being pressed. In some embodiments, the smart device 140 may display the reference fingering corresponding to the current fingering via a picture of a virtual instrument keyboard, a fingering, a hand posture, a text relating to the reference fingering associated with the current key being pressed, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
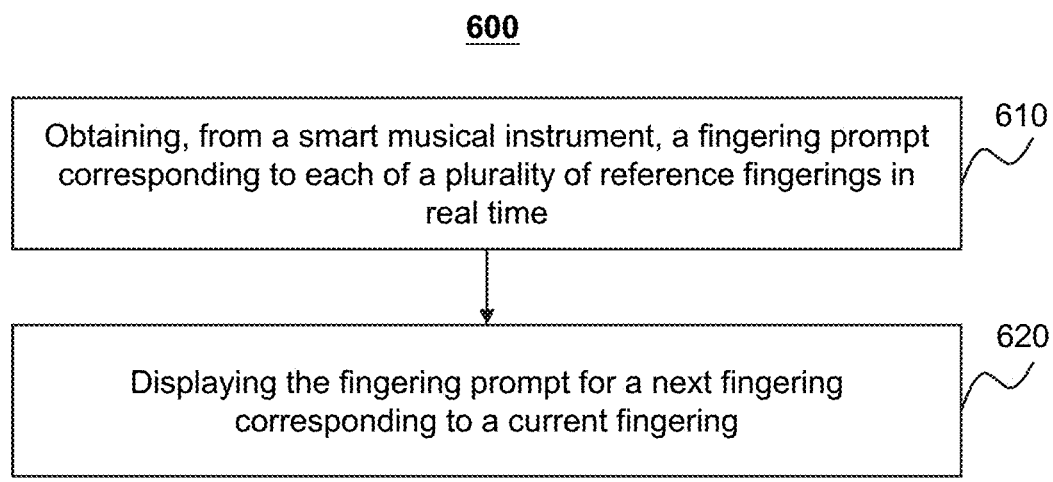
FIG. 6 is a flowchart illustrating an exemplary process for displaying a fingering prompt according to some embodiments of the present disclosure.

FIG. 6 is a flowchart illustrating an exemplary process for displaying a fingering prompt according to some embodiments of the present disclosure. In some embodiments, the process 600 may be implemented in the intelligent musical instrument system 100. For example, the process 600 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110) or the smart device 140 including a camera (e.g., the camera 160).

In 610, the smart device 140 (e.g., the information receiving module 420) may obtain, from a smart musical instrument, a fingering prompt corresponding to each of a plurality of reference fingerings in real-time.

A fingering prompt may be used to assist a user in performance on a musical instrument. The fingering prompt may include a precaution, a reminder relating to a reference fingering associated with a key being pressed. The fingering prompt may be in the form of text, graph, audio, video, or the like, or any combination thereof. In some embodiments, a plurality of fingering prompts corresponding to a plurality of reference fingerings may be stored in one or more components (e.g., the storage device 130) of the smart musical instrument (e.g., the musical instrument 150) or an external storage device. The smart device 140 may access the one or more components and retrieve the plurality of fingering prompts.

In 620, the smart device 140 (e.g., the teaching module 430) may display a fingering prompt for a next fingering corresponding to a current fingering.

In some embodiments, the smart device 140 may display the fingering prompt for the next fingering corresponding to the current fingering in response to a determination that the current fingering associated with a current key being pressed does not match with a reference fingering associated with the current key being pressed. In some embodiments, the smart device 140 may display the fingering prompt for the next fingering corresponding to the current fingering in response to a determination that the current key being pressed matches with the reference fingering associated with the current key being pressed. In some embodiments, the smart device 140 may display the fingering prompt for the next fingering corresponding to the current fingering no matter whether the current fingering associated with the current key being pressed matches with the reference fingering associated with the current key being pressed.

In some embodiments, the smart device may include an augment reality device, such as smart AR glasses. The smart musical instrument may include a smart piano. The smart device 140 may determine whether a current key being pressed matches with a reference key that should be pressed, whether a current fingering associated with the current key being pressed matches with a reference fingering associated with the current key being pressed, and whether a current hand posture matches with a reference hand posture, etc., based on information obtained from the smart AR glasses and the smart piano. The smart device 140 may generate a reminder in real time via a picture of a virtual instrument keyboard, a fingering, a hand posture, or a text when the user make an incorrect performance.

In some embodiments, the user may wear the smart AR glasses to practice the smart musical instrument. The smart AR glasses may display a virtual picture, a hand posture, or a text to prompt the user how to play the smart musical instrument, which may provide an effective way to assist the user in practicing the smart musical instrument.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 7:
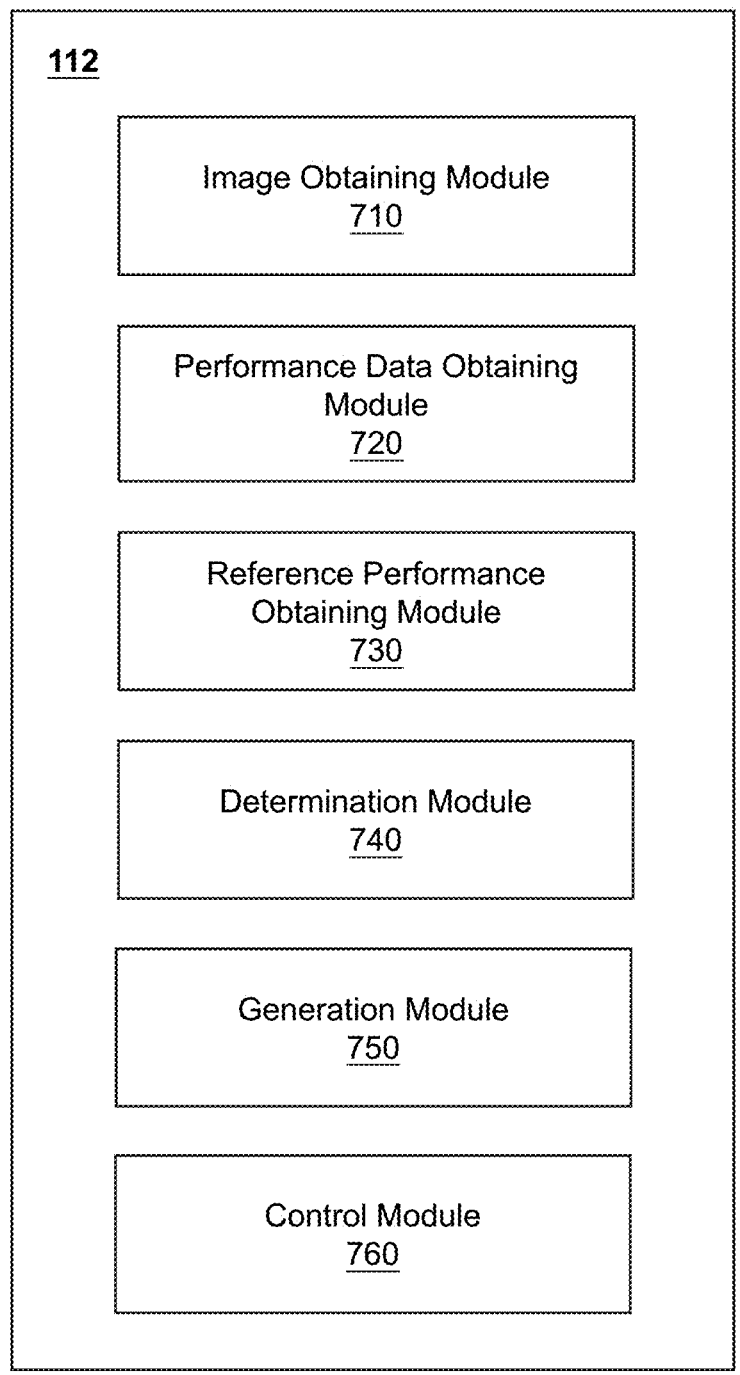
FIG. 7 is a block diagram illustrating an exemplary processing engine according to some embodiments of the present disclosure.

FIG. 7 is a schematic diagram illustrating an exemplary processing engine according to some embodiments of the present disclosure. In some embodiments, the processing engine 112 may include an image obtaining module 710, a performance data obtaining module 720, a reference performance obtaining module 730, a determination module 740, a generation module 750, and a control module 760. The modules may be hardware circuits of at least part of the processing engine 112. The modules may also be implemented as an application or set of instructions read and executed by the processing engine 112. Further, the modules may be any combination of the hardware circuits and the application/instructions. For example, the modules may be the part of the processing engine 112 when the processing engine 112 is executing the application or set of instructions.

The image obtaining module 710 may be configured to obtain image data from one or more components of the intelligent musical instrument system 100. In some embodiments, the image obtaining module 710 may obtain image data associated with at least one portion of a user acquired by one or more cameras. In some embodiments, the image data may reflect an operation of a musical instrument by the user as described elsewhere in the present disclosure (e.g., FIG. 8 and descriptions thereof). In some embodiments, the image obtaining module 710 may obtain the image data from one or more cameras (e.g., the camera 160) periodically (e.g., per second, per 2 seconds, per 5 seconds, per 10 seconds) or in real time. In some embodiments, during the capturing of the image data, the camera 160 may transmit the image data to a storage device (e.g., the storage device 130) periodically (e.g., per second, per 2 seconds, per 5 seconds, per 10 seconds) or in real time via the network 120. Further, the image obtaining module 710 may access the storage device and retrieve the image data.

In some embodiments, the image obtaining module 710 may transfer the image data to other modules of the processing engine 112 for further processing. For example, the image obtaining module 710 may transfer the image data to the determination module 740 for determining second performance data of the user from the image data.

The performance data obtaining module 720 may be configured to obtain first performance data of a user from one or more components of the intelligent musical instrument system 100. The first performance data may reflect an operation of the smart musical instrument by the user as described elsewhere in the present disclosure (e.g., FIGS. 8, 9, and descriptions thereof). In some embodiments, the performance data obtaining module 720 may obtain the first performance data of the user from a smart musical instrument. For example, the performance data obtaining module 720 may obtain the first performance data of the user from one or more sensors installed in the smart musical instrument.

In some embodiments, the performance data obtaining module 720 may transfer the first performance data to other modules of the processing engine 112 for further processing. For example, the performance data obtaining module 720 may transfer the first performance data to the determination module 740 for determining whether an operation of a smart musical instrument by a user matches a reference performance.

The reference performance obtaining module 730 may be configured to obtain a reference performance. As used herein, a reference performance may refer to a standard performance corresponding to a music score performed by the smart musical instrument as described elsewhere in the present disclosure (e.g., FIGS. 8, 9, and descriptions thereof). In some embodiments, a plurality of music scores and a plurality of reference performances corresponding to the plurality of music scores may be stored in a storage device (e.g., the storage device 130) of the intelligent musical instrument system 100 or an external storage device. When the user acquires and opens a specific music score via a user interface (e.g., a piano teaching application) of the smart musical instrument, the reference performance obtaining module 730 may access the storage device and retrieve the reference performance corresponding to the specific music score. In some embodiments, the reference performance obtaining module 730 may obtain a prompt corresponding to a reference performance. As used herein, a prompt may be used to assist a user in performance on a musical instrument as described elsewhere in the present disclosure (e.g., FIG. 10 and descriptions thereof).

In some embodiments, the reference performance obtaining module 730 may transfer the reference performance to other modules of the processing engine 112 for further processing. For example, the reference performance obtaining module 730 may transfer the reference performance to the determination module 740 for determining whether an operation of a smart musical instrument by a user matches the reference performance. As another example, the reference performance obtaining module 730 may transfer the reference performance to the control module 760 for causing a smart device to display the reference performance.

The determination module 740 may be configured to determine whether an operation of a smart musical instrument by a user matches a reference performance. In some embodiments, the determination module 740 may determine second performance data based on image data associated with at least one portion of a user. As used herein, the second performance data may refer to information related to at least one portion of a body of the user, such as a facial expression, limb movements of the user when playing the smart musical instrument as described elsewhere in the present disclosure (e.g., FIGS. 8, 9, and descriptions thereof). In some embodiments, the determination module 740 may determine whether the operation matches the reference performance based on the reference performance and at least one of first performance data, the second performance data, or image data. More descriptions for determining whether the operation matches the reference performance may be found elsewhere in the present disclosure (e.g., FIGS. 8, 9 and descriptions thereof).

In some embodiments, the determination module 740 may transfer a determination result to other modules of the processing engine 112 for further processing. For example, the determination module 740 may transfer the determination result to the generation module 750 for generating a reminder. As another example, the determination module 740 may transfer the determination result to the generation module 750 for causing a smart device to display a reference performance based on the determination result.

The generation module 750 may be configured to generate a reminder. In some embodiments, the generation module 750 may generate a reminder associated with an operation that does not match the reference performance. In some embodiments, the reminder may include an error included in the operation of the musical instrument by the user as described elsewhere in the present disclosure (e.g., FIGS. 8, 9, and descriptions thereof). In some embodiments, the generation module 750 may generate the reminder via a text, a voice, a picture, a video, or the like, or any combination thereof.

In some embodiments, the generation module 750 may transfer the reminder to other modules of the processing engine 112 for further processing. For example, the generation module 750 may transfer the reminder to the control module 760 for causing a smart device to display the reminder to a user.

The control module 760 may be configured to control one or more components of the intelligent musical instrument system 100. For example, the control module 760 may cause a smart device to display a reference performance. As another example, the control module 760 may cause a smart device to display a reminder to a user. As still another example, the control module 760 may cause a smart device to display a prompt associated with a reference performance based on at least one of image data and/or first performance data of a user.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
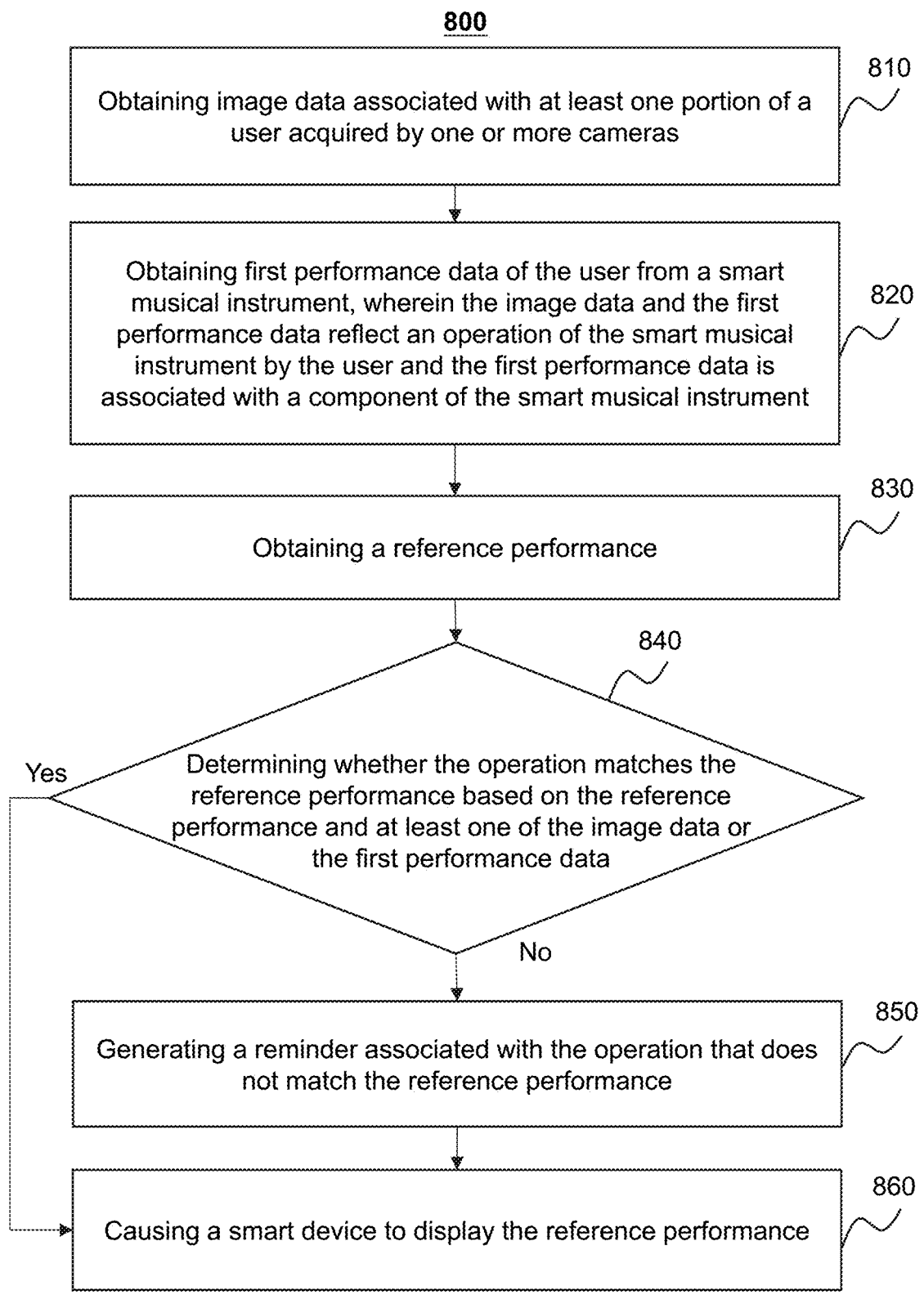
FIG. 8 is a flowchart illustrating an exemplary process for assisting a user in practicing a smart musical instrument according to some embodiments of the present disclosure.

FIG. 8 is a flowchart illustrating an exemplary process for assisting a user in practicing a smart musical instrument according to some embodiments of the present disclosure. In some embodiments, the process 800 may be implemented in the intelligent musical instrument system 100. For example, the process 800 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110) or the smart device 140 including a camera (e.g., the camera 160).

In 810, the processing engine 112 (e.g., the image obtaining module 710) may obtain image data associated with at least one portion of a user acquired by one or more cameras.

As used herein, the "image data" may refer to a static image, a series of image frames, a video, etc. The image data may be a two-dimensional image, a three-dimensional image, a four-dimensional image, etc. The image data may further include voice information associated with the image data. In some embodiments, the image data may reflect an operation of a musical instrument by the user. The musical instrument may include a keyboard instrument (e.g., a piano, an organ, an accordion, an electronic keyboard, a synthesizer), a wind instrument (e.g., a trumpet, a trombone, a euphonium, an oboe, a saxophone, a bassoon), a string instrument (e.g., a guitar, a violin, an autoharp, a cimbalom), a percussion instrument (e.g., a timpani, a snare drum, a bass drum, a cymbal, a tambourine), or the like, or any combination thereof. In some embodiments, the musical instrument may include a smart musical instrument (e.g., a smart piano). The operation of the musical instrument reflected by the image data may relate to at least one portion of a body of the user, such as a facial expression, limb movements, or the like, or a combination thereof. The facial expression may include happiness, anger, disgust, fear, sadness, etc. The limb movement may include a movement of a finger, the head, a foot, an arm, etc. For example, for key instruments (e.g., a piano) and/or string instruments (e.g., a guitar), the limb movement may include movements of one or more fingers, that may also be referred to as a fingering. As another example, for percussion instruments (e.g., a tambourine), the limb movement may include movements of hands, wrists and/or arms.

The fingering may relate to postures of a finger corresponding to a key being pressed by the user playing a musical instrument. In some embodiments, the fingering may include a movement direction of the finger, a movement speed of the finger, a strength of pressing a key by the finger, a gesture of the finger, or the like, or any combination thereof. In some embodiments, the fingering may be determined based on a key being pressed by the user, and/or a musical note produced according to the key being pressed by the user. For example, different musical notes may correspond to different keys of the musical instrument. Different keys of the musical instrument may correspond to different fingerings.

In some embodiments, the processing engine 112 may obtain the image data from one or more cameras (e.g., the camera 160) periodically (e.g., per second, per 2 seconds, per 5 seconds, per 10 seconds) or in real time. In some embodiments, during the capturing of the image data, the camera 160 may transmit the image data to a storage device (e.g., the storage device 130) periodically (e.g., per second, per 2 seconds, per 5 seconds, per 10 seconds) or in real time via the network 120. Further, the processing engine 112 may access the storage device and retrieve the image data.

In 820, the processing engine 112 (e.g., the performance data obtaining module 720) may obtain first performance data of the user from a smart musical instrument. The first performance data may reflect an operation of the smart musical instrument by the user.

The first performance data may be associated with one or more components of the smart musical instrument. The user may play the smart musical instrument via touching one or more components of the smart musical instrument. For example, for key instruments (e.g., a piano), the one or more components may include a key and/or a pedal. As another example, for string instruments (e.g., a guitar), the one or more components may include a string. As still another example, for percussion instruments (e.g., a tambourine), the one or more components may include a drumhead, a drumstick, etc. In some embodiments, the first performance data may relate to the one or more components being touched by the user at a specific time, motions of the one or more components being touched by the user, such as position information of the one or more components during a performance, time information related to motions of the one or more components during the performance, or the like. In some embodiments, the first performance data may be obtained in real time. In some embodiments, the smart musical instrument may be a piano including a plurality of keys and one or more pedals. When a user fingers on a keyboard of the piano and/or feet step on the pedals, the first performance data may be recorded and transferred to the processing engine 112. Accordingly, the first performance data may include an identity of a current key being pressed, a time of the current key being pressed, a time of the pedal being stepped on, a musical note produced by the current key being pressed, a musical note produced by the pedal being stepped on, etc. In some embodiments, the first performance data may be obtained at a time period. The first performance data may be stored in a storage device (e.g., the storage device 130) of the intelligent musical instrument system 100. Accordingly, the first performance data may include an identity of each of keys being pressed during the time period, a time of each of the keys being pressed during the time period, times of the pedal being stepped on during the time period, a musical note produced by each of the keys being pressed during the time period, musical notes produced by the pedal being stepped on during the time period, etc.

In some embodiments, the processing engine 112 may obtain the first performance data of the user from one or more sensors installed in the smart musical instrument. The sensor may be configured to detect information associated with the one or more components (e.g., motion information and/or time information) of the smart musical instrument during the user playing the smart musical instrument. For example, for a piano including a plurality of keys, one or more of the plurality of keys may be associated with a specific sensor. The specific sensor may detect which key associated with the specific sensor is pressed by the user. As a further example, the specific sensor may generate a sensor signal in response to detect the motion information of the keys and/or the pedals of the piano. The sensor signal may be an electric signal, such as a current signal, a voltage signal, or the like. In some embodiments, the value of the sensor signal may represent the motion information and/or time information of the corresponding key being pressed or released. For example, the sensor signal may indicate which one of the plurality of keys and when is pressed. In some embodiments, the sensor may include an optoelectronic sensor, an accelerometer, a magneto-electric sensor, a piezoelectric sensor, an angle sensor, or the like, or any combination thereof.

In 830, the processing engine 112 (e.g., the reference performance obtaining module 730) may obtain a reference performance.

As used herein, a reference performance may refer to a standard performance corresponding to a music score performed by the smart musical instrument. The musical score may exist in various forms, such as a staff, a numbered musical notation, etc. The music score may include a plurality musical notes. As used herein, a musical note may refer to a pitch and a duration of a sound. The reference performance corresponding to the music score may include a reference key corresponding to a musical note, a reference fingering associated with a key being pressed, a reference strength of pressing a key, a reference hand posture, a reference face expression, or the like, or any combination thereof. In some embodiment, the reference performance may include a standard performance generated automatically by the processing engine 112 based on a music score, a performance of a teacher, a performance of an expert, or the like.

In some embodiments, a plurality of music scores and a plurality of reference performances corresponding to the plurality of music scores may be stored in a storage device (e.g., the storage device 130) of the intelligent musical instrument system 100 or an external storage device. When the user acquires and opens a specific music score via a user interface (e.g., a piano teaching application) of the smart musical instrument, the processing engine 112 may access the storage device and retrieve the reference performance corresponding to the specific music score.

In 840, the processing engine 112 (e.g., the determination module 740) may determine whether the operation matches the reference performance based on the reference performance and at least one of the image data or the first performance data.

In some embodiments, the processing engine 112 may determine second performance data based on the image data associated with at least one portion of the user. As used herein, the second performance data may refer to information related to at least one portion of a body of the user, such as a facial expression, limb movements of the user when playing the smart musical instrument as described in connection with operation 810. For example, if the smart musical instrument is a piano including a plurality of keys and one or more pedals, the second performance data may include a fingering associated with a key being pressed by the user.

In some embodiments, the processing engine 112 may determine the second performance data based on the image data according to one or more object detection algorithms and/or one or more feature extraction algorithms. For example, the processing engine 112 may first detect an object (e.g., a finger, a hand, a face) in the image data and further extract the feature information associated with the object. The processing engine 112 may detect the object in the image data based on an object detection algorithm (e.g., an inter-frame difference algorithm, a background difference algorithm, an optical flow algorithm). After detecting the object in the image data, the processing engine 112 may extract the feature information associated with the object based on a feature extraction algorithm. Exemplary feature extraction algorithm may include a principal component analysis (PCA), a linear discriminant analysis (LDA), an independent component analysis (ICA), a multi-dimensional scaling (MDS) algorithm, a discrete cosine transform (DCT) algorithm, or the like. For example, the processing engine 112 may determine the feature information such as a finger feature, a hand feature, a body feature, a facial feature, based on a machine learning model (e.g., a neural network model, a regression model, a classification tree model). The second performance data may be determined based on the feature information.

In some embodiments, the processing engine 112 may determine whether the operation matches the reference performance based on the reference performance and at least one of the first performance data, the second performance data, or the image data. In some embodiments, the processing engine 112 may compare the operation with the reference performance to determine whether an error happens. In some embodiments, the smart musical instrument may be a piano including a plurality of keys. The processing engine 112 may identify a current key being pressed by the user based on the first performance data and/or the image data. For example, the processing engine 112 may identify the current key being pressed by the user from one or more sensors installed in the smart musical instrument as described in connection with operation 820. As another example, the processing engine 112 may identify the current key being pressed by the user from the image data according to one or more object detection algorithms and/or one or more feature extraction algorithms. The processing engine 112 may identify a current fingering associated with the current key being pressed based on the second performance data. The processing engine 112 may determine a reference fingering associated with the current key being pressed based on a reference performance corresponding to a music score performed by the smart musical instrument. The processing engine 112 may compare the current fingering associated with the current key being pressed with the reference fingering associated with the current key being pressed to determine whether an error happens. More descriptions for comparing the current fingering associated with the current key being pressed with the reference fingering associated with the current key being pressed may be found elsewhere in the present disclosure (e.g., FIG. 9 and descriptions thereof).

In response to a determination that the operation matches the reference performance, process 800 may proceed to operation 860. In response to a determination that the operation does not match the reference performance, the process 800 may proceed to operation 850.

In 850, the processing engine 112 (e.g., the generation module 750) may generate a reminder associated with the operation that does not match the reference performance.

In some embodiments, the reminder may include an error included in the operation of the musical instrument by the user. The error may indicate that where in the operation that does not match the reference performance. In some embodiments, the processing engine 112 may generate the reminder via a text, a voice, a picture, a video, or the like, or any combination thereof. For example, the processing engine 112 may generate the reminder via a picture of a virtual instrument keyboard generated by the smart device, a hand posture, or a text relating to the current fingering associated with the current key being pressed. In some embodiments, the processing engine 112 may transfer the reminder to a smart device (e.g., the smart device 140) associated with the user. The processing engine 112 may further cause the smart device to display the reminder to the user. For example, the processing engine 112 may cause the smart device to display the current fingering associated with the current key being pressed that does not match the reference fingering associated with the current key being pressed on a picture of a virtual instrument keyboard.

In 860, the processing engine 112 (e.g., the control module 760) may cause a smart device to display the reference performance. The smart device may include an augmented reality (AR) device, for example, a smart mobile device (e.g., a smart mobile phone, a smart pad), and a smart wearable device (e.g., smart glasses) as described elsewhere in the present disclosure (e.g., FIG. 1 and the descriptions thereof).

In some embodiments, the processing engine 112 may cause the smart device to display the reference performance via a text, a voice, a picture, a video, or the like, or any combination thereof. For example, the processing engine 112 may cause the smart device to display the reference fingering associated with the current key being pressed on a picture of a virtual instrument keyboard. As another example, the processing engine 112 may cause the smart device to display a text relating to the reference fingering associated with the current key being pressed on a visual interface of the smart device (e.g., the smart device 140).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, operation 850 may be omitted. As another example, operation 860 may be omitted. As still another example, an operation for displaying the image data of the user may be added. The processing engine 112 may display the real-time image on an interface of the smart device (e.g., the smart device 140) in real-time.

Figure 9:
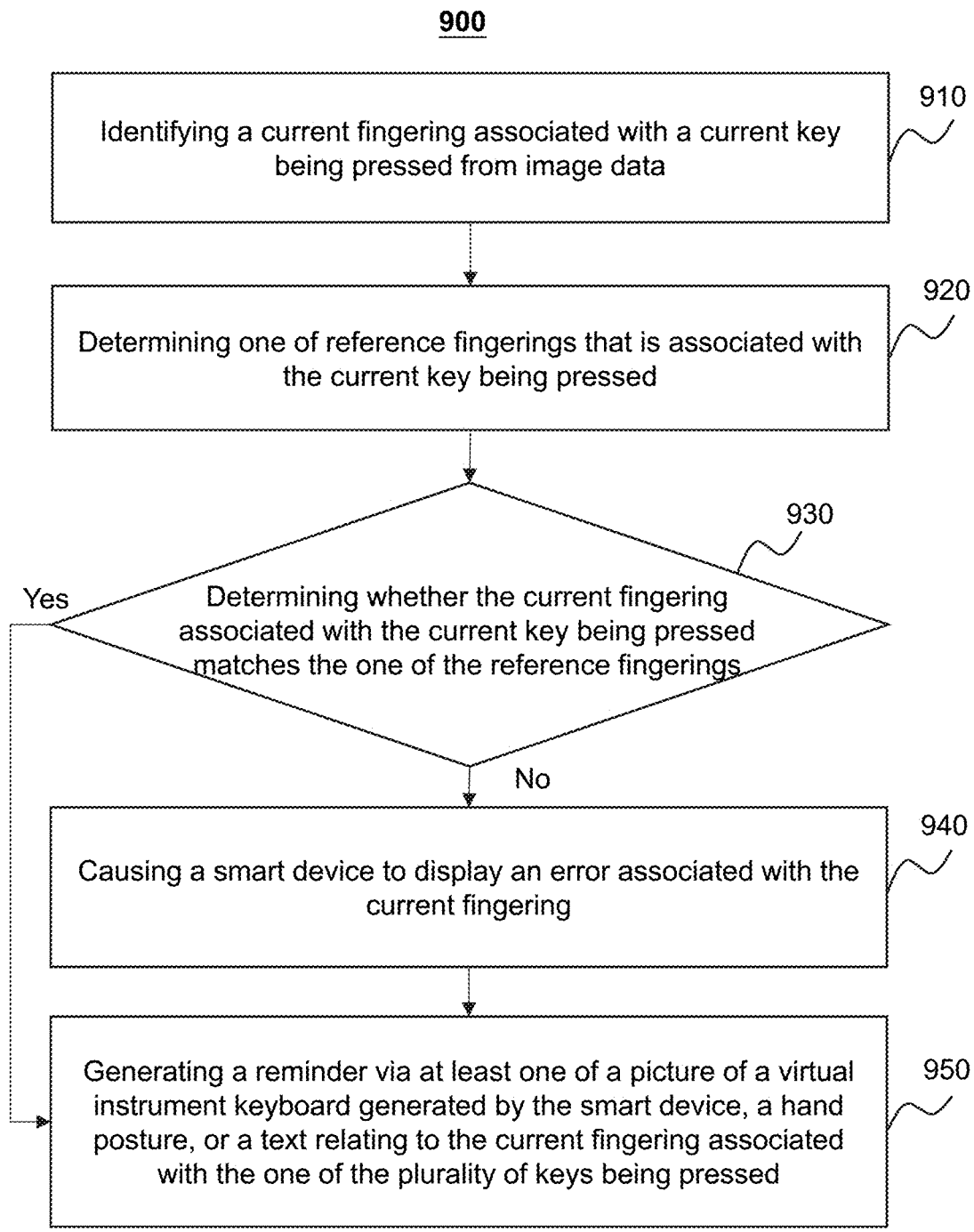
FIG. 9 is a flowchart illustrating an exemplary process for assisting a user in practicing a smart musical instrument according to some embodiments of the present disclosure.

FIG. 9 is a flowchart illustrating an exemplary process for assisting a user in practicing a smart musical instrument according to some embodiments of the present disclosure. In some embodiments, the process 900 may be implemented in the intelligent musical instrument system 100. For example, the process 900 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110) or the smart device 140 including a camera (e.g., the camera 160).

In 910, the processing engine 112 (e.g., the performance data obtaining module 720) may identify a current fingering associated with a current key being pressed from image data. The image data may be obtained as described in connection with operation 810 as illustrated in FIG. 8.

As used herein, a current fingering may refer to postures of a finger corresponding to the current key being pressed by the user playing the musical instrument. The processing engine 112 may identify the current fingering associated with the current key being pressed based on the image data of the user according to one or more object detection algorithms and/or one or more feature extraction algorithms as described in connection with operation 840. For example, the processing engine 112 may first detect fingers in the image data and further extract the feature information associated with the fingers based on a machine learning model (e.g., a neural network model, a regression model, a classification tree model).

In 920, the processing engine 112 (e.g., the reference performance obtaining module 730) may determine one of reference fingerings that is associated with the current key being pressed.

The processing engine 112 may identify the current key being pressed by the user. In some embodiments, the processing engine 112 may identify the current key being pressed based on first performance data as described in connection with operation 820. The first performance data may include an identity of each of keys being pressed during a time period, a time of each of the keys being pressed during the time period, times of the pedal being stepped on during the time period, a musical note produced by each of the keys being pressed during the time period, musical notes produced by the pedal being stepped on during the time period, etc. In some embodiments, the processing engine 112 may obtain the first performance data of the user from one or more sensors installed in one or more components of the smart musical instrument. In some embodiments, the sensor may include a key sensor and a pedal sensor. Each key sensor may correspond to a key, and each pedal sensor may correspond to a pedal. For example, the key sensor may generate an electric signal representative of a motion state of a corresponding key. In some embodiments, the key sensor and/or the pedal sensor may be coupled to the key and/or the pedal. For example, the key sensor and/or the pedal sensor may be installed above or below the key and/or the pedal. In some embodiments, the processing engine 112 may identify the current key being pressed from the image data. The processing engine 112 may identify the current key being pressed based on the image data according to one or more object detection algorithms and/or one or more feature extraction algorithms. For example, the processing engine 112 may first detect keys in the image data and further extract feature information associated with the keys based on a machine learning model (e.g., a neural network model, a regression model, a classification tree model). The processing engine 112 may identify the current key being pressed based on the feature information associated with the keys.

As used herein, a reference fingering may refer to standard postures of a finger corresponding to a key of the musical instrument. In some embodiment, a plurality of reference fingerings corresponding to a music score may be stored in a storage device (e.g., the storage device 130) of the intelligent musical instrument system 100. The plurality of reference fingerings corresponding to the music score may be associated with a plurality of keys which need to be pressed for playing a sound associated with the music score. When a user opens the music score via a user interface (e.g., a piano teaching application) of the smart musical instrument or the smart device 140, the processing engine 112 may access the storage device and retrieve the plurality of reference fingerings corresponding to the music score. When the user touches the current key, the processing engine 112 may further determine the reference fingering associated with the current key being pressed from the plurality of reference fingerings.

In 930, the processing engine 112 (e.g., the determination module 740) may determine whether the current fingering associated with the current key being pressed matches the one of the reference fingerings.

In some embodiments, the processing engine 112 may compare the current fingering associated with the current key being pressed with the reference fingering associated with the current key being pressed to determine whether an error happens. For example, the processing engine 112 may determine whether a similarity between the current fingering associated with the current key being pressed and the reference fingering associated with the current key being pressed is larger than a threshold. In response to a determination that the similarity between the current fingering associated with the current key being pressed and the reference fingering associated with the current key being pressed is larger than the threshold. The processing engine 112 may determine that the current fingering associated with the current key being pressed matches the reference fingering associated with the current key being pressed. In response to a determination that the similarity between the current fingering associated with the current key being pressed and the reference fingering associated with the current key being pressed is less than or equal to the threshold. The processing engine 112 may determine that the current fingering associated with the current key being pressed does not match the reference fingering associated with the current key being pressed, and an error happens.

In response to a determination that the current fingering associated with the current key being pressed does not match the reference fingering associated with the current key being pressed, process 900 may proceed to operation 940. In response to a determination that the current fingering associated with the current key being pressed matches the reference fingering associated with the current key being pressed, process 900 may proceed to operation 950.

In 940, the processing engine 112 (e.g., the control module 760) may cause a smart device to display an error associated with the current fingering. In some embodiments, the smart device may include an augmented reality (AR) device, for example, a smart mobile device (e.g., a smart mobile phone, a smart pad), and a smart wearable device (e.g., smart glasses) as described elsewhere in the present disclosure (e.g., FIG. 1 and the descriptions thereof).

In some embodiments, the processing engine 112 may cause the smart device to display the error via texts, pictures, sounds, lights, vibrations, or the like, or any combination thereof. For example, the smart device may be a smart bracelet, and the user may wear the smart bracelet on a wrist of the user when playing the smart musical instrument. If the current fingering associated with the current key being pressed does not match the reference fingering associated with the current key being pressed, the processing engine 112 may cause the smart bracelet to vibrate to alert the user that an error happens. As another example, the smart bracelet may include one or more lighting emitting devices, the processing engine 112 may cause the one or more lighting emitting devices of the smart bracelet to illuminate to alert the user that an error happens. As still another example, the smart device may be smart glasses, and the user may wear the smart glasses when playing the smart musical instrument. The processing engine 112 may cause the smart glasses to display the error associated with the current fingering on a picture of a virtual instrument keyboard generated by the smart glasses.

In 950, the processing engine 112 (e.g., the generation module 750) may generate a reminder via at least one of a picture of a virtual instrument keyboard generated by the smart device, a hand posture, or a text relating to the current fingering associated with the one of the plurality of keys being pressed.

In some embodiments, the processing engine 112 may transfer the reminder to the smart device (e.g., the smart device 140) associated with the user. The processing engine 112 may further cause the smart device to display the reminder to the user. For example, the processing engine 112 may cause the smart device to display the reference fingering associated with the current key being pressed on a picture of a virtual instrument keyboard. As another example, the processing engine 112 may cause the smart device to display a text relating to reference fingering associated with the current key being pressed on a visual interface of the smart device (e.g., the smart device 140).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, operation 940 may be omitted. As another example, operation 950 may be omitted. In some embodiments, one or more operations may be integrated into a single operation. For example, operation 940 and operation 950 may be integrated into a single operation.

Figure 10:
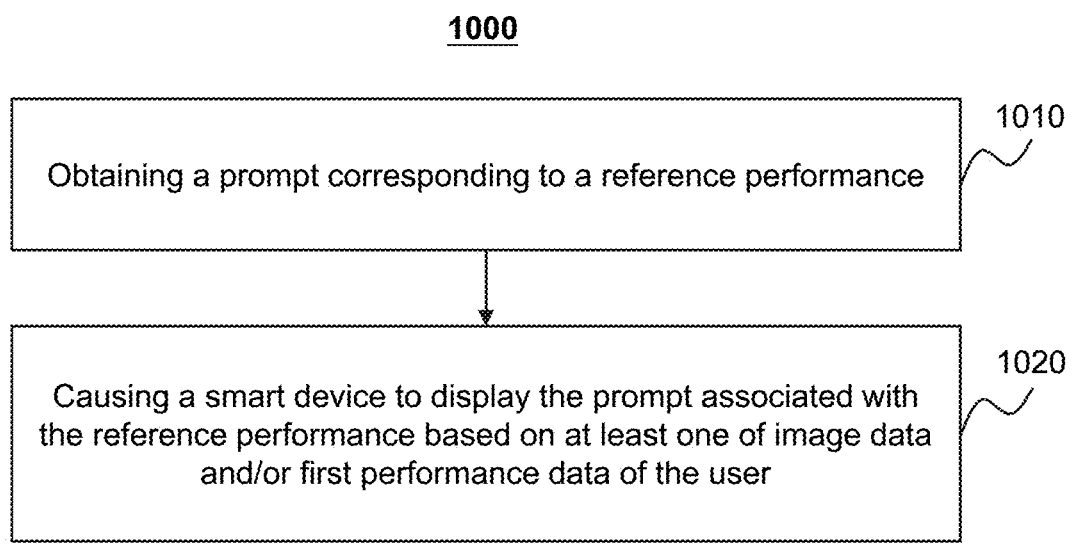
FIG. 10 is a flowchart illustrating an exemplary process for displaying a prompt according to some embodiments of the present disclosure.

FIG. 10 is a flowchart illustrating an exemplary process for displaying a prompt according to some embodiments of the present disclosure. In some embodiments, the process 1000 may be implemented in the intelligent musical instrument system 100. For example, the process 1000 may be stored in the storage device 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110) or the smart device 140 including a camera (e.g., the camera 160).

In 1010, the processing engine 112 (e.g., the reference performance obtaining module 730) may obtain a prompt corresponding to a reference performance.

As used herein, a prompt may be used to assist a user in performance on a musical instrument. In some embodiments, the prompt may include a precaution or a reminder associated with the reference performance. The reference performance may include a reference key corresponding to a musical note, a reference fingering associated with a key being pressed, a reference strength of pressing a key, a reference hand posture, a reference face expression as described in connection with operation 830. The prompt may be in the form of text, graph, audio, video, or the like, or any combination thereof. In some embodiments, the prompt may be a fingering prompt corresponding to the reference fingering associated with the key being pressed as described in connection with operation 610. For example, the fingering prompt may include one or more key words relating to the reference fingering associated with the key being pressed. As another example, the fingering prompt may include a graph relating to the reference fingering associated with the key being pressed.

In some embodiment, a plurality of music scores, a plurality of reference performances corresponding to the plurality of music scores, and a plurality of prompts corresponding to the plurality of reference performances may be stored in a storage device (e.g., the storage device 130) of the intelligent musical instrument system 100. When a user acquires and opens a specific music score via a user interface (e.g., a piano teaching application) of a smart musical instrument or the smart device 140, the processing engine 112 may access the storage device and retrieve the reference performance corresponding to the specific music score, and the prompt corresponding to the reference performance. In some embodiments, the reference performance may include a plurality of reference fingerings associated with a plurality of keys which need to be pressed for playing a sound associated with the specific music score. A plurality of fingering prompts corresponding to the plurality of reference fingerings may be stored in a storage device (e.g., the storage device 130) of the intelligent musical instrument system 100. When the user touches a current key, the processing engine 112 may determine the reference fingering associated with the current key being pressed from the plurality of reference fingerings. The processing engine 112 may access the storage device and retrieve the fingering prompt corresponding to the reference fingering associated with the current key being pressed.

In 1020, the processing engine 112 (e.g., the control module 760) may cause a smart device to display the prompt associated with the reference performance based on at least one of image data and/or first performance data of a user. In some embodiments, the smart device may include an augmented reality (AR) device, for example, a smart mobile device (e.g., a smart mobile phone, a smart pad), a smart wearable device (e.g., smart glasses) as described elsewhere in the present disclosure (e.g., FIG. 1 and the descriptions thereof).

In some embodiments, the processing engine 112 may cause the smart device to display the prompt associated with the reference performance based on at least one of the image data and/or the first performance data of the user in real time. For example, the processing engine 112 may identify a current fingering associated with a current key being pressed from the image data as described in connection with operation 910. The processing engine 112 may identify the current key being pressed by the user based on the image data and/or the first performance data as described in connection with operation 920. The processing engine 112 may determine a reference fingering associated with the current key being pressed by the used based on a reference performance corresponding to a music score performed by the smart musical instrument as described in connection with operation 920. The processing engine 112 may obtain a fingering prompt corresponding to the reference fingering associated with the current key being pressed. Accordingly, the processing engine 112 may cause the smart device to display the fingering prompt corresponding to the reference fingering associated with the current key being pressed in real time when the user practicing the smart musical instrument. As another example, the processing engine 112 may cause the smart device to display a fingering prompt corresponding to a next reference fingering corresponding to the current fingering associated with the current key being pressed in real time when the user practicing the smart musical instrument.

In some embodiments, the processing engine 112 may cause the smart device to display the prompt in response to a determination that an operation of the smart musical instrument by the user does not match the reference performance. For example, the processing engine 112 may determine whether the current fingering associated with the current key being pressed matches the reference fingering associated with the current key being pressed as described in connection with operation 930. The processing engine 112 may cause the smart device to display the prompt corresponding to the reference fingering associated with the current key being pressed in response to a determination that the current fingering associated with the current key being pressed does not match the reference fingering associated with the current key being pressed.

In some embodiments, the processing engine 112 may cause the smart device (e.g., the smart device 140) to display the prompt in the form of text, graph, audio, video, or the like, or any combination thereof. For example, the processing engine 112 may cause the smart device to display a fingering prompt correspond to the next fingering corresponding to the current fingering on a picture of a virtual instrument keyboard generated by the smart device in real time.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for assisting a user in practicing a smart musical instrument implemented on a smart device having one or more cameras, one or more processors, and one or more storage devices, the method comprising:
    obtaining, by the one or more processors, image data associated with at least one portion of a user acquired by the one or more cameras;
    obtaining, by the one or more processors, first performance data of the user from the smart musical instrument, wherein the image data and the first performance data reflect an operation of the smart musical instrument by the user and the first performance data is associated with a component of the smart musical instrument;
    obtaining, by the one or more processors, a reference performance, wherein the reference performance includes reference fingerings associated with a plurality of keys;
    determining whether the operation matches the reference performance based on the reference performance and at least one of the image data or the first performance data, wherein the determining whether the operation matches the reference performance based on the reference performance and at least one of the image data or the first performance data includes:
        determining a current key being pressed from the first performance data;
        identifying a current fingering associated with the current key being pressed from the image data;
        determining a specific reference fingering from the plurality of reference fingerings according to the current key being pressed; and
        determining whether the current fingering associated with the current key being pressed matches the specific reference fingering;
    in response to a determination that the operation does not match the reference performance,
        generating, by the one or more processors, a reminder associated with the operation that does not match the reference performance; and
    causing, by the one or more processors, the smart device to display the reference performance.

2. The method of claim 1, wherein the component of the smart musical instrument includes at least one of a plurality of keys or a pedal, and the first performance data includes at least one of:
    an identity of the current key being pressed,
    a time of the current key being pressed,
    a time of the pedal being stepped on,
    a musical note produced by the current key being pressed, and
    a musical note produced by the pedal being stepped on.

3. The method of claim 1, wherein the determining whether the operation matches the reference performance based on the reference performance and at least one of the image data or the first performance data includes:
    identifying second performance data from the image data, the second performance data being associated with at least one portion of a body of the user; and
    determining whether the operation matches the reference performance based on the first performance data and the second performance data.

4. The method of claim 3, wherein the second performance data includes the current fingering associated with the current key being pressed.

5. The method of claim 4, further comprises:
    the generating a reminder is done by at least one of a picture of a virtual instrument keyboard generated by the smart device, a hand posture, or a text relating to the current fingering associated with the one of the plurality of keys being pressed.

6. The method of claim 4, further comprises:
    causing the smart device to display an error associated with the current fingering.

7. The method of claim 1, further comprises:
    obtaining a prompt corresponding to the reference performance; and
    causing the smart device to display the prompt associated with the reference performance based on at least one of the image data and/or the first performance data of the user.

8. The method of claim 1, further comprises:
    causing the smart device to display the image data of the user.

9. A system for assisting a user in practicing a smart musical instrument, the system comprising:
    one or more cameras;
    one or more storage devices storing one or more sets of instructions; and one or more processors in communication with the one or more cameras, the one or more storage devices, wherein when executing the one or more set of instructions, the one or more processors is configured to cause the system to:
obtain, by the one or more processors, image data associated with at least one portion of a user acquired by the one or more cameras;
obtain, by the one or more processors, first performance data of the user from the smart musical instrument, wherein the image data and the first performance data reflect an operation of the smart musical instrument by the user and the first performance data is associated with a component of the smart musical instrument;
obtain, by the one or more processors, a reference performance, wherein the reference performance includes reference fingerings associated with a plurality of keys;
determine whether the operation matches the reference performance based on the reference performance and at least one of the image data or the first performance data, wherein to determine whether the operation matches the reference performance based on the reference performance and at least one of the image data or the first performance data includes:
determine a current key being pressed from the first performance data;
identify a current fingering associated with the current key being pressed from the image data;
determine a specific reference fingering from the plurality of reference fingerings according to the current key being pressed; and
determine whether the current fingering associated with the current key being pressed matches the specific reference fingering;
in response to a determination that the operation does not match the reference performance,
generate, by the one or more processors, a reminder associated with the operation that does not match the reference performance; and
cause, by the one or more processors, the smart device to display the reference performance.

10. The system of claim 9, wherein the component of the smart musical instrument includes at least one of a plurality of keys or a pedal, and the first performance data includes at least one of:
an identity of a current key being pressed,
a time of the current key being pressed,
a time of the pedal being stepped on,
a musical note produced by the current key being pressed, and
a musical note produced by the pedal being stepped on.

11. The system of claim 9, wherein to determine whether the operation matches the reference performance based on the reference performance and at least one of the image data or the first performance data, the one or more processors is configured to cause the system to:
identify second performance data from the image data, the second performance data being associated with at least one portion of a body of the user; and
determine whether the operation matches the reference performance based on the first performance data and the second performance data.

12. The system of claim 11, wherein the second performance data includes a current fingering associated with the current key being pressed.

13. The system of claim 12, wherein:
the reminder includes at least one of a picture of a virtual instrument keyboard generated by the smart device, a hand posture, or a text relating to the current fingering associated with the one of the plurality of keys being pressed.

14. The system of claim 12, the one or more processors is configured to cause the system to:
cause the smart device to display an error associated with the current fingering.

15. The system of claim 9, the one or more processors is configured to cause the system to:
obtain a prompt corresponding to the reference performance; and
cause the smart device to display the prompt associated with the reference performance based on at least one of the image data and/or the first performance data of the user.

16. The system of claim 9, the one or more processors is configured to cause the system to:
cause the smart device to display the image data of the user.

17. A non-transitory computer readable medium, comprising at least one set of instructions for assisting a user in practicing a smart musical instrument, wherein when executed by one or more processors of a computing device, the at least one set of instructions causes the computing device to perform a method, the method comprising:
obtaining, by the one or more processors, image data associated with at least one portion of a user acquired by the one or more cameras;
obtaining, by the one or more processors, first performance data of the user from the smart musical instrument, wherein the image data and the first performance data reflect an operation of the smart musical instrument by the user and the first performance data is associated with a component of the smart musical instrument;
obtaining, by the one or more processors, a reference performance, wherein the reference performance includes reference fingerings associated with a plurality of keys;
determining whether the operation matches the reference performance based on the reference performance and at least one of the image data or the first performance data, wherein the determining whether the operation matches the reference performance based on the reference performance and at least one of the image data or the first performance data includes:
determining a current key being pressed from the first performance data;
identifying a current fingering associated with the current key being pressed from the image data;
determining a specific reference fingering from the plurality of reference fingerings according to the current key being pressed; and
determining whether the current fingering associated with the current key being pressed matches the specific reference fingering;
in response to a determination that the operation does not match the reference performance,
generating, by the one or more processors, a reminder associated with the operation that does not match the reference performance; and
causing, by the one or more processors, the smart device to display the reference performance.

18. The non-transitory computer readable medium of claim 17, wherein the component of the smart musical instrument includes at least one of a plurality of keys or a pedal, and the first performance data includes at least one of:
   an identity of the current key being pressed,
   a time of the current key being pressed,
   a time of the pedal being stepped on,
   a musical note produced by the current key being pressed, and
   a musical note produced by the pedal being stepped on.

19. The non-transitory computer readable medium of claim 17, wherein the determining whether the operation matches the reference performance based on the reference performance and at least one of the image data or the first performance data includes:
   identifying second performance data from the image data, the second performance data being associated with at least one portion of a body of the user; and
   determining whether the operation matches the reference performance based on the first performance data and the second performance data.

20. The non-transitory computer readable medium of claim 19, wherein the second performance data includes a current fingering associated with a current key being pressed.

* * * * *